Figure 1B:
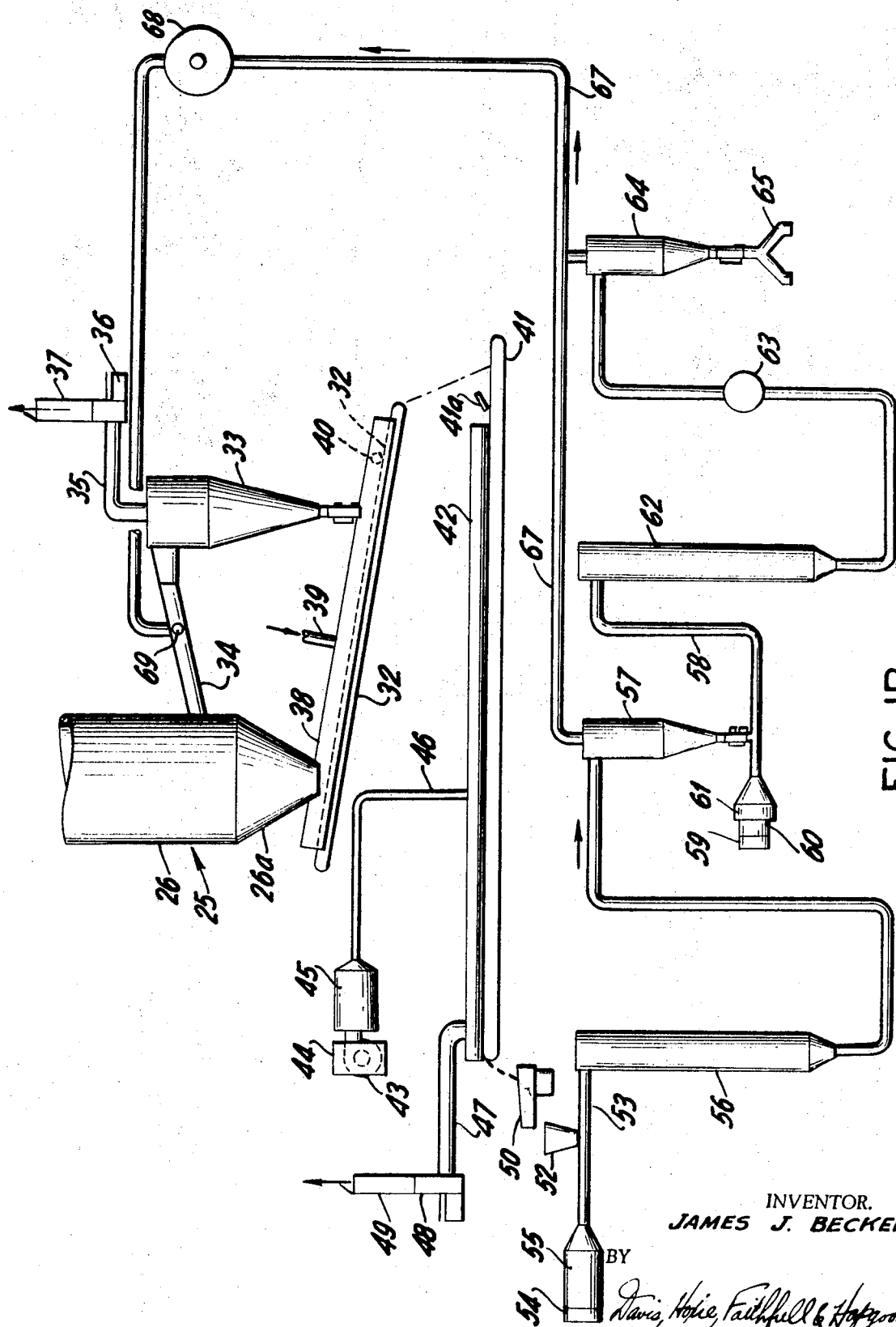

United States Patent

[11] 3,615,663

| [72] | Inventor | James Joseph Becker<br>River Falls, Wis. |
|---|---|---|
| [21] | Appl. No. | 815,622 |
| [22] | Filed | Apr. 14, 1969 |
| [45] | Patented | Oct. 26, 1971 |
| [73] | Assignee | The DeLaval Separator Company<br>Poughkeepsie, N.Y. |

[54] PRODUCTION OF NONHYGROSCOPIC ACID WHEY POWDER
4 Claims, 2 Drawing Figs.

| [52] | U.S. Cl. | 99/57, 99/203 |
|---|---|---|
| [51] | Int. Cl. | A23c 21/00 |
| [50] | Field of Search | 99/57, 203 |

[56] References Cited
UNITED STATES PATENTS

| 2,118,252 | 3/1935 | Kraft | 99/57 |
|---|---|---|---|
| 2,197,804 | 4/1940 | Lavett | 99/57 |
| 2,661,294 | 12/1953 | Meade | 99/57 X |
| 3,447,930 | 6/1969 | Francis | 99/57 |

OTHER REFERENCES

Hall et al., Drying Milk and Milk Products. The Avi Publ. Co., Inc., Westport, Conn., 1966 (pages 62–67) SF 259 H 19 c.2.

*Primary Examiner*—Lionel M. Shapiro
*Assistant Examiner*—D. M. Naff
*Attorney*—Davis, Hoxie, Faithfull & Hapgood

ABSTRACT: After pasteurizing the acid whey and condensing it in an evaporator, it is flash-cooled and passed to a cold-wall storage tank of the type having an agitator which sweeps the exposed surface of the cold wall. The whey is thus stored until small crystals of the lactose are formed and the whey acquires a smooth texture in which the lactose crystals are invisible to the naked eye, and thereafter the conditioned whey is spray dried to form a powder.

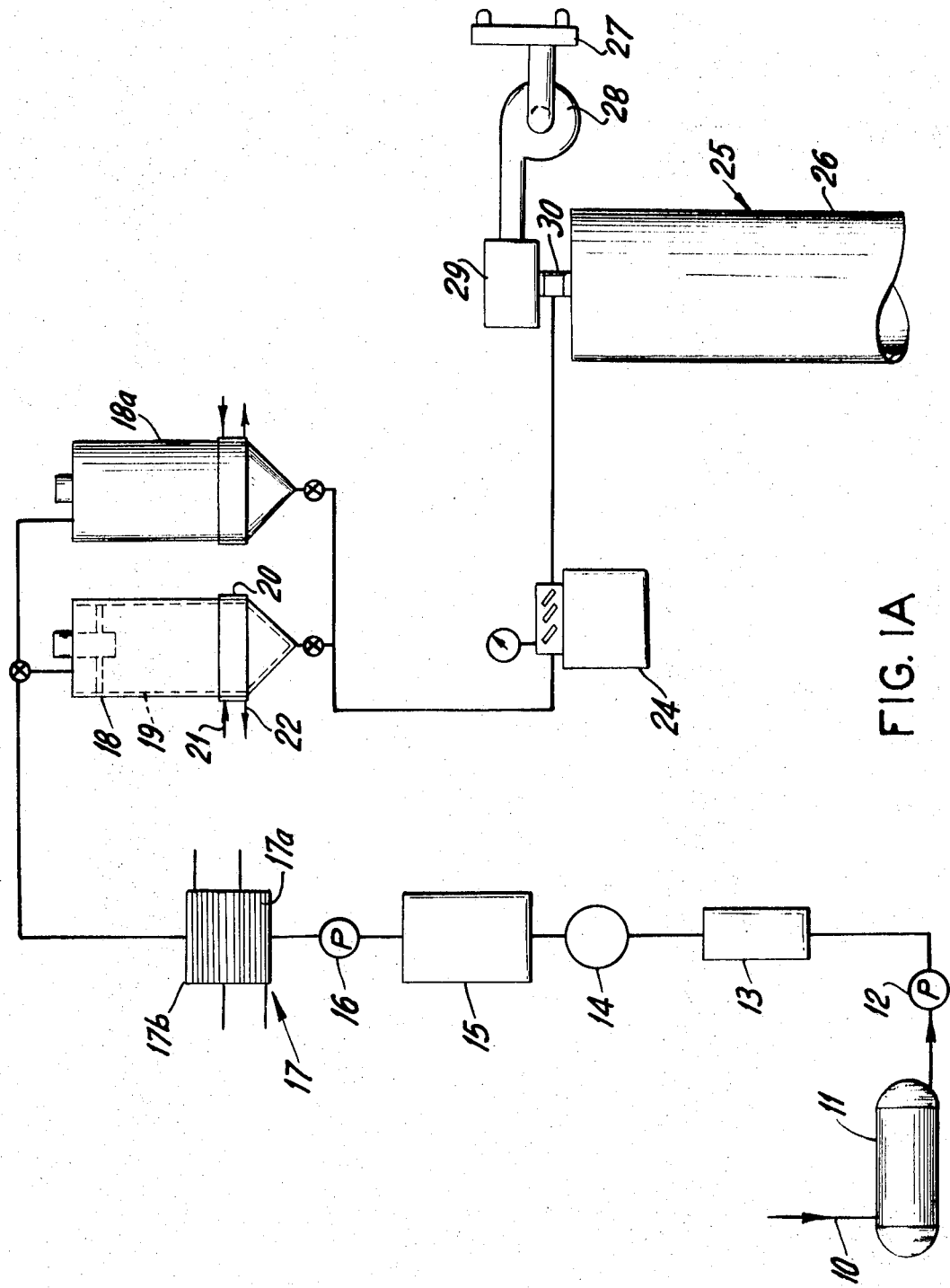
FIG. IA
INVENTOR.
JAMES J. BECKER

PRODUCTION OF NONHYGROSCOPIC ACID WHEY POWDER

THE DISCLOSURE

This invention relates to the production of powder from so-called acid whey, such as the whey obtained when making cottage, baker's or cream cheese and usually having a pH value of 4.2 to 4.5.

It is known in the art to spray dry sweet whey, such as that obtained in making cheddar and Italian cheeses and usually having a pH value of 5.5 to 5.8. However, if the procedures used to prepare the sweet whey for spray drying are used for acid whey, the results are unsatisfactory. In particular, oversized lactose crystals are formed from the acid whey, and these crystals will not drop from the walls of the spray drying chamber but instead become glazed on the walls and must be ground or chipped therefrom.

The principal object of the present invention is to provide a method for treating acid whey so that it can be spray dried without the above-mentioned difficulty.

According to the invention, the acid whey is heated to a pasteurizing temperature of about 142° to 165° F. and then condensed in an evaporator, after which the condensed whey is flash-cooled to a temperature of about 32° to 50 ° F. The whey is then held in a storage tank of the type having a cold wall exposed to the stored content and provided with an agitator which sweeps the exposed surface of the cold wall, the whey being held at a temperature of about 32° to 50° F. and preferably 38° to 44° F. by circulating a coolant through the cold wall section of the tank. During this storage, the lactose in the whey forms very small crystals and acquires a smooth texture in which the lactose crystals are undetectable by the naked eye or by feel. The attainment of this condition generally requires at least four hours of storage.

When the whey thus conditioned is spray dried, the aforesaid glazing of lactose crystals on the walls of the spray drying chamber is avoided. Moreover, the particle size of the resulting product may be varied by adjusting the pressure at which the whey is delivered to the spray nozzle for atomizing the whey in the drying chamber; and the particles can be readily processed to provide a powder of the desire characteristics.

For a better understanding of the invention, reference may be had to the accompanying drawings showing schematically a system for effecting a preferred practice of the new method. In the drawings, FIGS. 1A and 1B are schematic views of different parts of the system.

Referring to the drawings, the raw fluid acid whey, such as that obtained when making cottage, baker's or cream cheese, is pumped through pipeline 10 into a surge tank 11. This whey is usually at a temperature of about 105°–115° F. when removed from the cheese vats or process tables (not shown). If the raw whey contains a significant quantity of fat, the latter is preferably removed by centrifugal separation, and if the whey contains a significant amount of solids not in solution, these solids are also preferably removed, as by passing the whey through a centrifugal clarifier (not shown).

To prevent further acidification of the raw whey, it is pasteurized before entering the tank 11. The pasteurization may be effected in a plate heat exchanger (not shown) at a temperature of 142°–163° F.; and it is preferably preceded by any separation of fat and/or solids from the whey. In cases where the whey is gathered from different sources and cannot be delivered quite promptly to a common pasteurizer, the batches from the separate sources should be separately pasteurized. In other words, once the whey is separated from the curd, it is important that the whey be pasteurized with sufficient promptness to avoid decreasing its pH. In this way, the whey can be held in tank 11 for 24 hours without impairing its use for subsequent processing as hereinafter described.

From tank 11, the whey is delivered through pump 12 to a repasteurizer 13, which may be a heater of the tube or plate type. A conventional holding tube (not shown) may be used in conjunction with the pasteurizer 13 to insure pasteurization if the hot whey is to be fed directly to the evaporator hereinafter described. The hot whey may be pumped directly to the evaporator 15 or to a holding tank 14 where it awaits further pasteurizing. In the pasteurizer 13, the whey is brought to a temperature between a minimum of 142° F. and a maximum of 163° F. If the whey is to be held at a pasteurizing temperature in this range, the use of the lower part of the range is often beneficial in producing the final product.

In cases where the whey can be passed from its source to the evaporator 15 without holding the whey for any substantial period, so that its acidity cannot increase significantly, it can be subjected to only a single pasteurization at the temperature range from 142° F. to 163° F. In any case, however, the temperature at which the whey enters the evaporator 15 should not exceed 163° F., because otherwise coagulation of serum solids can cause plugging and burning-on in the evaporator 15.

In evaporator 15, which may be of the double effect type, the whey is brought to a solids content preferably of about 45 percent corresponding to a density of about 22° Baume. The heat treatment of the whey should be such as to avoid increasing the viscosity to the point where the whey cannot be readily pumped, cooled, agitated and atomized. If desired, the evaporator 15 may comprise preevaporators used in advance of a finishing pan, where the aforesaid solids content is obtained.

The temperature of the condensed whey leaving the evaporator 15 may be in the order of 135°–140° F., although this temperature may be higher or lower depending upon the type of evaporating equipment used. In any event, the warm condensed whey from the evaporator immediately passes through pump 16 and is forced at a pressure exceeding 35 p.s.i.g., but usually less than 65 p.s.i.g., through a cooler 17 where the whey is flash cooled to a temperature of about 32°–50° F., preferably 35°–40° F. The flash cooler 17 may be of the plate or tubular type and preferably includes a first section 17a, where well water is used as the cooling medium, and a second section 17b where ice water, brine or glycol may be used as the cooling medium.

This flash cooling at 17, which occurs in a matter of seconds, is essential to the present invention. The whey leaving this step, and cooled to the temperature range heretofore described, must be flowable for further processing. Accordingly, the previous evaporating step at 15 should not be carried beyond the point where the cold whey from the flash cooler is easily pourable from a glass, as in the case of cold coffee cream.

The cold condensed whey is pumped from flash cooler 17 into a special vertical storage tank 18 of the cold wall type. This tank is insulated and provided with a slow-speed rotary agitator 19 which sweeps the cold wall surface and the bottom of the tank. The whey in tank 18 is maintained at a temperature of 32°–50° F. (preferably 38°–44° F.) by means of the tank's cold wall section 20, through which a suitable coolant is circulated by way of pipelines 21 and 22. The agitator 19 is operated continuously at a speed of 1 to 10 r.p.m. from the time the whey is delivered to tank 18 until the level therein drops to expose the agitator blades.

During the period of its storage in tank 18, the whey should have a solids content of about 35—52 percent, although somewhat higher values are acceptable. A solids content within this range will generally be maintained in the tank as a result of the processing previously described; but if it should vary substantially from this range, suitable adjustment may be effected by adding solids or liquid to the whey in tank 18. The pH value of the whey may vary during this storage; but generally a pH of 4.0 to 4.4 is satisfactory and will be maintained without any special measures. However, if it should be necessary to adjust the pH to a higher value for any reason, such as contamination of the whey during the cheesemaking, or inadequate pasteurization or sterilization procedures, such adjustment may be effected by a conventional neutralizer of any suitable type. Of course, the neutralizing solution should not be so strong as to burn or discolor the solids in the whey.

The whey may be held in tank 18 for a period up to 5 days. Generally a holding period exceeding 4 hours is required to effect the change hereinafter described which is necessary prior to spray drying the whey, and a holding period of about 24 hours is preferred.

During this holding period in tank 18, a change occurs in the lactose in the whey such that the lactose solution crystallizes without additives and in a natural manner, and the resulting crystals are very fine in nature. More particularly, inspection of the whey after a holding period of 4 to 6 hours will reveal a smooth texture, with no lactose crystals independently visible to the naked eye or detectable by feeling the liquid with the hands. In fact, the successful production of nonhygroscopic powder in accordance with the invention is largely dependent upon this lack of visible lactose or the inability to physically feel large lactose particles in the whey when it leaves the tank 18.

If desired, a second holding tank 18a, similar to tank 18, may be provided for receiving a new batch of flash-cooled whey while the tank 18 is still occupied.

After the whey has been conditioned as previously described in the holding tank 18 or 18a, it is pumped by a high-pressure positive pump 24 to a spray dryer 25 constituting the primary drying part of the process. The dryer 25 comprises a primary drying chamber 26 of the vertical type ranging in size from 46 inches to 15 feet in diameter and from 12 feet to as much as 60 feet in height, the chamber having a conical bottom and a relatively flat top. The drying air is drawn through a filter 27 by a fan 28 and forced through a heater 29, which may be of the direct fired type. The heated air is injected downwardly into the drying chamber 26 by way of a neck 30 forming a duct which opens through the top of the chamber at its central portion. The drying chamber 26 is sized according to the hourly volume of dried product to be produced, and the hot air duct leading into the chamber is sized accordingly to the volume of air required for the product volume.

The condensed whey from pump 24 is delivered to the neck 30 and injected through a nozzle (not shown) into the stream of hot air entering the drying chamber 26. The pressure at which the whey is thus injected is from 500 p.s.i.g. to 10,000 p.s.i.g., depending upon the type of nozzle used, the viscosity of the whey and the particle size desired in the final product. The initial temperature of the hot air supplied to the chamber 26 may also vary from as low as 200° F. to as high as 600° F., depending upon the volume of powder required per hour and the size of the primary drying chamber. The condensed whey is injected into the hot air stream at essentially the same temperature at which the whey is stored in tank 18 or 18a.

Since spray dryers of the type described are well known in the art, it is unnecessary to describe further details of the dryer 25.

It will be understood that in some cases, ax when spray drying whey gathered from remote locations, the whey may be pasteurized, condensed and flash cooled at those locations and then held under conditions similar to those described with respect to tank 18.

In the spray dryer 25, the whey is atomized into small particles which are partially dried and are allowed to collect on the sides of the primary drying chamber 26. If a coarse final particle size is desired, a lower pressure is used in the atomization, a higher atomizing pressure being productive of a finer final particle size. The partially dried particles of condensed whey adhere to the side walls and the conical bottom section 26a of the drying chamber 26 until the state of the accumulated material is such as to allow it to drop through a bottom opening in the conical section 26a, the released material being deposited upon an underlying conveyor belt 32 (FIG. 1B). The time elapsing from the start of the whey injection into drying chamber 26, until the partially dried material begins to discharge therefrom, varies from about 5 to 30 minutes.

In the preferred practice of the invention, the partially dried whey from the spray dryer 25 is subjected to further processing which will now be described with reference to FIG. 1B.

A minor fraction of the partially dried whey is carried from the primary drying chamber 26 into a cyclone 33 by way of a duct 34 opening through the side of the drying chamber just above its conical section 26a. In the cyclone 33, the powdery material is separated from the accompanying hot, moist drying air by centrifugal action, the powder being discharged through the bottom of the cyclone and onto the primary conveyor belt 32. This fraction of the material discharged from the cyclone has a moisture content of about 6 to 12 percent, the lower part of this range being preferred. The hot, moist drying air is drawn from the drying chamber 26 through the cyclone collector 33 and through a duct 35 extending from the top of the cyclone to an exhaust fan 36. The air may be discharged from this fan to atmosphere by way of a duct 37.

The powder dropping through the bottom of the conical section 26a of drying chamber 26 has a moisture content of about 10 to 15 percent, depending upon the condition of the prepared condensed whey entering the drying chamber. The latter is kept under a slight vacuum, as by means of the exhaust fan 36, so as to permit filtered air at ambient room temperature to leak upward into the drying chamber and thereby precool the powder being discharged therefrom.

The primary conveyor belt 32 is of sufficient length and is driven at such a speed as to permit the moist powder received from the bottom opening of chamber 26 to remain in contact with cool air (32° F. to 90° F.) for a period of at least about 7 seconds and preferably longer. For this purpose, a stationary hood 38 may by provided above the belt 32, and filtered air may be admitted under controlled pressure to the chamber within the hood by way of a duct 39, the air being discharged from this chamber through suitable leakage openings (not shown).

The powder discharged through the bottom of chamber 26 passes through an opening in the hood 38 to deposit on belt 32. As it is being conveyed on this belt, this powder undergoes a physical change and appears as individual particles of varying size, generally about one-tenth to one-fourth of an inch long and from one-twentieth to three-sixteenth of an inch in diameter, the particles having an appearance quite similar to that of rice. As shown, the powder discharged through the bottom of cyclone 33 also passes through an opening in hood 38 and is deposited on the powder being conveyed by belt 32 from the bottom opening of chamber 26. The powder from cyclone 33 should have a lower moisture content than the powder from the bottom of chamber 26 and will generally have a moisture content of about 6 to 12 percent. As by means of a small rotating bar 40 provided with tines (not shown) the powder from the cyclone is mixed with the powder from the bottom of chamber 26 and quickly takes on the appearance, texture and quality of the latter powder as the powder from the cyclone absorbs some of the moisture in the other powder.

The mixed powder is discharged from belt 32 onto a second belt 41 which is substantially wider and longer than the belt 32. As by means of a blade 41a, the mixed powder is distributed on belt 41 to a depth of about one-eighth of an inch to one inch. The conveyor belt 41 is covered by a hood 42 forming a heat plenum chamber which can be open at both ends and both sides. However, the hood 42 is shown as part of a closed system comprising an air blower or fan 43 which draws air through a filter 44 and forces it through a heater 45 and duct 46 into the plenum chamber. In this chamber, the hot air at a temperature of from 175° F. to as high as 400° F. is directed downwardly onto the bed of moist powder on belt 41. At intervals along this belt are suitable mixing devices (not shown) of any conventional type for turning and agitating the powder to insure an even and thorough drying of the product. The hot, moist air from the belt 41 is discharged through a duct 47 leading from the hood 42 to an exhaust fan 48, the latter discharging the air to atmosphere by way of a duct 49.

The powder discharged from belt 41 is at a temperature of about 90° F. to 140° F., and its moisture content may be as high as 9 percent or as low as 2 percent. A moisture content of about 4 percent to 7½ percent at this stage is deemed to produce the bet end product. From belt 41, the powder is discharged into a vibrating tray 50 which agitates the powder and breaks it up into smaller particles.

The powder is discharged from tray 50 into a hopper or funnel 52 from which it enters a pneumatic conveying line 53. Air is drawn into this line through a filter 54 and a heater 55, which heats the air to a temperature of 200° F. to 375° F. depending upon the moisture in the powder and the desired moisture content in the final product to be packaged, preferably about 3 to 4 percent. The flow of heated air carries the powder from hopper 52 through pipeline 53 to the top of a vertical tube 56, where the powder is held in suspension for approximately 5 to 16 seconds to permit it to assume its final nonhygroscopic nature. The powder is conveyed pneumatically from the bottom of tube 56 to a cyclone 57 where air is separated from the powder, the latter discharging from the bottom of the cyclone into a pneumatic conveying line 58. Air is drawn into the line 58 through a coarse filter 59, a cooling coil 60 and a fan filter 61, the air thus cooled serving to cool the powder to an acceptable final packing temperature, generally about 100° F. Pipeline 58 conveys the powder pneumatically to the top of a vertical tube 62 where the powder is again held in suspension for a short period of time. From the bottom of tube 62, the powder is conveyed pneumatically to another cyclone 64, by way of a hammermill 63 if desired. After being separated from air in cyclone 64, the powder is discharged through the bottom of the cyclone to a filling head 65 where the powder is bagged in any suitable manner.

The air separated from the powder in cyclones 57 and 64 is drawn through the tops of these cyclones into a duct 67 leading to a fan or blower 68, from which the air is discharged into the duct 34, as shown at 69. This air from blower 68 serves to temper the warm, moist air from the drying chamber 26 and permits the primary cyclone 33 to operate most effectively on the powder of relatively high moisture content collected in the cyclone 33. If desired, the air exhausted from the hood 42 by blower 48, instead of being discharged to atmosphere, may also be discharged at 69 into the duct 34.

By practice of the new process, the powder produced from the acid whey can be made so nonhygroscopic that it will not pick up more than 1 percent moisture by weight when subjected to high humidity and high temperature conditions, that is, a humidity of 80–95 percent and a temperature of 80°–120° F. Thus, the powder is satisfactory for human food and commercial use. The powder remains relatively stable in the bag or other package; and when it is left in a flat dish exposed to normal room temperatures and humidity, the powder will remain granular or in powder form with practically no crusting.

By way of example, the dried material delivered through duct 34 to the primary cyclone 33 may constitute 20 to 25 percent of the total amount of dried material obtained from the drying chamber 26. The temperature of the air delivered by blower 60 to the duct 34 at 69 may be from 100° to 190° F.; and the temperature of the cooled air entering duct 58 from the air cooler 60 may be 60° to 200+ F.

The following is a specific example of the practice of the invention:

Acid whey having a pH value of 4.2 is pumped through pasteurizer 13, where it is heated to a temperature of 162° F., and then through evaporator 15 where it is brought to a solids content of 50 percent. The condensed whey leaves evaporator 15 at a temperature of 120° F. and is forced by pump 16 through flash cooler 17 at a pressure of 45 p.s.i.g. the whey being flash cooled to a temperature of 45° F. In storage tank 18, the flash-cooled whey is held at a temperature of 45° F. for a period of 24 hours while operating the agitator 19 at a speed of 8 r.p.m. and during this period the solids content and pH value of the whey are maintained as previously described. The whey from storage tank 18 is delivered to the nozzle of spray dryer 25 at a temperature of 45° F. and a pressure of 3,000 p.s.i.g. The air from heater 29 is forced through neck 30 at a temperature of 310° F. and at a rate of 10,000 cubic feet per minute, the whey being delivered to the spray nozzle at a rate of 130 gallons per hour. This spray nozzle is sold by Spraying Systems Company and identified as "Whirl Jet" with 01.5 Spin Chamber and 01 Orifice.

Of the total amount of dried material obtained from drying chamber 26, 20 percent by weight is delivered to primary cyclone 33. The powder discharged from this cyclone has a moisture content of 5.5 percent, and the powder dropping through the bottom of drying chamber 26 has a moisture content of 12.5 percent. The powder discharged from belt 41 is at a temperature of 100° F. and has a moisture content of 5.5 percent. The air from heater 55 is at a temperature of 300° F.; the temperature of the air from cooler 60 is 60° F.; and the temperature of the air delivered at 69 to duct 34 from blower 68° is 85° F.

The flash cooler 17 may be of the construction sold by The DeLaval Separator Company and identified as Model No. P 5 or Type RC. The storage tank 18 may be of the construction sold by Walker Stainless Equipment Company and known as a vertical mixing tank.

I claim:

1. In the production of nonhygroscopic acid whey powder, the method which comprises pasteurizing acid whey by heating it to a temperature of about 142° to 165° F., passing the heated and pasteurized whey to an evaporating step and there condensing the whey to a solids content of about 35 to 52 percent by weight, flowing a stream of the condensed whey through a cooling step and there flash-cooling the whey to a temperature of about 32° to 50° F., holding the cooled whey in a storage zone in contact with a cold wall while circulating a coolant to maintain said wall cold and while sweeping said wall and agitating the stored whey, said holding being effected at a temperature of about 32° to 50° F. and for a time of at least about 4 hours and sufficient to form small crystals of lactose and to condition the whey by providing it with a smooth texture in which said crystals are invisible to the naked eye and undetectable by feel, and spray drying the conditioned whey to form a powder.

2. The method of claim 1, in which said spray drying is effected by injecting the conditioned whey at a pressure of about 500 to 10,000 p.s.i.g. into a stream of hot air entering a drying chamber, the temperature of the hot air entering said chamber being about 200° to 600° F.

3. The method of claim 1, in which said spray drying is effected by injecting the conditioned whey at a pressure of about 500 to 10,000 p.s.i.g. into a stream of hot air entering a drying chamber, the temperature of the hot air entering said chamber being about 200° to 600° F., the method comprising also the steps of discharging a first portion of said powder from the drying chamber together with drying air and subjecting said first portion to a cyclone action to separate drying air therefrom, collecting a second portion of said powder dropping from the bottom of said chamber, and mixing said two portions whereby said first portion from the cyclone action absorbs moisture from said second portion.

4. The method of claim 1, in which the whey is pumped through said flash-cooling step at a pressure of about 35 to 60 p.s.i.g.

* * * * *

UNITED STATES PATENT OFFICE
CERTIFICATE OF CORRECTION

Patent No. 3,615,663     Dated October 26, 1971

Inventor(s) James Joseph Becker

It is certified that error appears in the above-identified patent and that said Letters Patent are hereby corrected as shown below:

Column 3, line 53, "ax" should be --as--.

Column 4, line 75, "bet" should be --best--.

Column 5, line 54, "200+F" should be --100°F--.

Column 6, line 9, "01.5" should be --#1.5--.

Column 6, line 10, "01" should be --#1--.

Signed and sealed this 2nd day of January 1973.

(SEAL)
Attest:

EDWARD M. FLETCHER, JR.
Attesting Officer

ROBERT GOTTSCHALK
Commissioner of Patents